United States Patent
Luneau et al.

(10) Patent No.: US 9,090,733 B2
(45) Date of Patent: Jul. 28, 2015

(54) USE OF SALTS OF BRANCHED FATTY ACIDS AS CATALYSTS FOR CONVERTING STAR-SHAPED ALCOHOLS USING ISOCYANATES

(75) Inventors: Benoit Luneau, Düsseldorf (DE); Lars Zander, Rommerskirchen (DE); Rolf Tenhaef, Düsseldorf (DE); Nadine Warkotsch, München (DE); Brigitte Giesen, Düsseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 398 days.

(21) Appl. No.: 13/457,673

(22) Filed: Apr. 27, 2012

(65) Prior Publication Data

US 2012/0226063 A1  Sep. 6, 2012

Related U.S. Application Data

(63) Continuation of application No. PCT/EP2010/065012, filed on Oct. 7, 2010.

(30) Foreign Application Priority Data

Oct. 28, 2009  (DE) .......................... 10 2009 046 074

(51) Int. Cl.
*C07F 7/10* (2006.01)
*C08G 18/22* (2006.01)
*C08G 18/18* (2006.01)
*C08G 18/24* (2006.01)
*C08G 18/71* (2006.01)

(52) U.S. Cl.
CPC .......... *C08G 18/222* (2013.01); *C08G 18/1875* (2013.01); *C08G 18/225* (2013.01); *C08G 18/244* (2013.01); *C08G 18/718* (2013.01)

(58) Field of Classification Search
CPC ............................. C07F 7/0854; C07F 7/1836
USPC ......................................................... 556/423
See application file for complete search history.

(56) References Cited

U.S. PATENT DOCUMENTS

| | | | |
|---|---|---|---|
| 4,374,237 A * | 2/1983 | Berger et al. | 528/28 |
| 4,515,933 A | 5/1985 | Chang | |
| 6,362,302 B1 | 3/2002 | Boddie | |
| 2005/0064093 A1 * | 3/2005 | Graham et al. | 427/142 |

FOREIGN PATENT DOCUMENTS

| | | |
|---|---|---|
| DE | 102004011348 A1 | 9/2005 |
| DE | 102007039649 A1 | 6/2008 |
| EP | 1314747 A1 | 5/2003 |
| EP | 1870424 A1 | 12/2007 |
| GB | 2300639 A | 11/1996 |
| WO | 04/000905 A1 | 12/2003 |
| WO | WO 04000905 A1 * | 12/2003 |

* cited by examiner

*Primary Examiner* — Porfirio Nazario Gonzalez
*Assistant Examiner* — Kofi Adzamli
(74) *Attorney, Agent, or Firm* — Thomas G. Krivulka

(57) ABSTRACT

The invention relates to the use of salts of branched fatty acids for catalyzing the reaction between star-shaped alcohols and isocyanates.

5 Claims, No Drawings

_US 9,090,733 B2_

USE OF SALTS OF BRANCHED FATTY ACIDS AS CATALYSTS FOR CONVERTING STAR-SHAPED ALCOHOLS USING ISOCYANATES

CROSS-REFERENCE TO RELATED APPLICATIONS

This application is a continuation of PCT/EP2010/065012, filed on Oct. 7, 2010, which claims priority under 35 U.S.C. §119 to DE 10 2009 046 074.8 filed on Oct. 28, 2009, both of which are hereby incorporated by reference.

FIELD OF THE INVENTION

The present invention generally relates to the use of salts of branched fatty acids for catalyzing the reaction of star-shaped alcohols with isocyanates.

BACKGROUND OF THE INVENTION

Various catalysts for the reaction of star-shaped alcohols with isocyanates are known from the prior art. Preferred catalysts for this reaction are exemplified by amines such as diazabicyclo-octane (DABCO) and organotin compounds such as dialkyl tin (IV) salts of aliphatic carboxylic acids, including dibutyltin dilaurate and dibutyltin dioctoate. However, one problem with the use of these catalysts is that they also catalyze unwanted side reactions, such as the trimerization of isocyanates. Particularly when using isocyanates that carry silyl groups, there is also the problem that the reaction of silyl groups with each another is also catalyzed, possibly leading to unwanted reaction products.

In spite of the prior art, there is a continual need to explore new catalysts for the reaction between star-shaped alcohols and isocyanates.

BRIEF SUMMARY OF THE INVENTION

It has now been surprisingly found that salts of branched fatty acids exhibit significantly better catalytic properties for the reaction between star-shaped alcohols and isocyanates than those catalysts previously employed.

Although the use of such salts for the reaction of alcohols with isocyanates is already known from the prior art, it was surprising that sterically-hindered, branched compounds like star-shaped alcohols are efficiently reacted in the presence of these salts.

In particular, it was particularly surprising in this regard that an almost complete conversion of the hydroxyl groups of the star-shaped alcohol with isocyanate groups can be achieved with a lesser amount of catalyst in a lesser reaction time.

Furthermore, it was surprising that the use of this catalyst affords almost no unwanted side reactions, in particular even when isocyanates that carry silyl groups were used.

In an embodiment of the present invention, a lower amount of catalyst may be used to catalyze the reaction between star-shaped alcohols and isocyanates than when a customary catalyst was used.

In another embodiment of the present invention, the resulting reaction product is substantially free of catalysts due to the lower amount of catalyst used. This is particularly advantageous in view of the very laborious and costly removal of leftover catalyst. Another advantage in this regard is that, due to the absence of amines and tin ions, which are inevitably also present in the end product when previously customary catalysts such as DABCO or dibutyltin dilaurate are employed, the reaction product does not carry over unwanted by-products from the subsequent reactions. The lack of unwanted by-products results in greater storage stability.

Another advantage is that, due to the almost quantitative conversion of the hydroxyl groups with isocyanate groups, the reaction product comprises practically no free hydroxyl groups, such that the reaction product is free of reactive groups that could also enter into unwanted side reactions.

Another advantage is that on adding the inventive catalyst, the already directly obtained reaction product is also at least substantially free of side products and not only ensuing subsequent reactions are prevented.

Accordingly, a first subject matter of the present invention is the use of a salt of branched fatty acids for catalyzing the reaction of star-shaped alcohols with isocyanate compounds.

Another subject matter of the present invention is a process for manufacturing star-shaped polymers by reacting a star-shaped alcohol with isocyanate compounds, wherein a salt of branched fatty acids is employed for catalyzing the reaction.

Likewise, star-shaped polymers that are obtainable by reacting star-shaped alcohols with isocyanate compounds in the presence of salts of branched fatty acids as well as a composition that comprises the inventive star-shaped polymers are a further subject matter of the present invention.

Furthermore, other desirable features and characteristics of the present invention will become apparent from the subsequent detailed description of the invention and the appended claims, taken in conjunction with the accompanying drawings and this background of the invention.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

In a first embodiment of the present invention, salts of branched fatty acids are used to catalyze the reaction between star-shaped alcohols and isocyanates.

In another embodiment of the present invention, a process is disclosed for manufacturing a star-shaped polymer, said process comprising the step of reacting a star-shaped alcohol and an isocyanate in the presence of a salt of a branched fatty acid used as the reaction catalyst.

In another embodiment of the present invention, star-shaped polymers are disclosed and are obtainable by reacting star-shaped alcohols with isocyanate compounds in the presence of salts of branched fatty acids.

In another embodiment of the present invention, compositions comprising star-shaped polymers are disclosed.

In accordance with the present invention, star-shaped polymers that contain less than 0.1 wt %, in particular less than 0.05 wt %, preferably less than 0.03 wt %, and above all less than 0.02 wt % of catalyst, are inventively preferred. They are further preferably characterized in that at least 95%, in particular at least 96 or 97%, above all at least 98 or 99%, and particularly preferably all hydroxyl groups of the star-shaped alcohols were reacted with isocyanate compounds. Preferably, they are further characterized in that they are essentially, preferably totally, free of amine and tin compounds, and/or are extremely storage stable. Moreover, they preferably comprise no toxic substances.

The branched fatty acids of the salt to be employed herein are preferably selected from $C_{3\text{-}24}$ fatty acids, particularly $C_{4-20}$ fatty acids, and particularly preferably from $C_{6-16}$ fatty acids. The branched fatty acid is particularly preferably an octanoic acid, in particular 2-ethylhexanoic acid, or a decanoic acid, and in particular neodecanoic acid.

The counter ions of the inventively employed salt are inventively preferably selected from Zn(II) and Bi(III).

In a preferred embodiment, the inventively employed salt exists in the form of a polynuclear complex.

Inventively preferred catalysts are commercially available under the trade names Borchi® Kat 22 (CAS 68551-44-0; zinc octoate 22 wt %, $C_{6-19}$ fatty acids 78 wt %) and Borchi® Kat 24 (CAS 67874-71-9; bismuth 2-ethylhexanoate 75 wt %, $C_{3-24}$ fatty acids 25 wt %) from OMG Borchers GmbH.

In a preferred embodiment, star-shaped polymers that possess peripheral hydroxyl groups are employed as the star-shaped alcohols.

Compounds of the formula $Z(-X-A-Y-OH)_m$ are preferably employed as the star-shaped alcohols, wherein:

Z stands for a central branch moiety that determines the maximum number of arms of the star-shaped polymer;

A stands for a hydrophilic polymeric arm;

X and Y stand independently of one another for a chemical bond or for a divalent, low molecular weight organic group having preferably 1 to 50, especially 2 to 20 carbon atoms; and m stands for a number from 3 to 500,000 and preferably is in agreement with the number of arms of Z, and the m (-X-A-Y-OH) groups independently of one another can have a different meaning.

The central branch moiety of the inventive star-shaped polymers is preferably a low molecular weight organochemical central moiety or an inorganic oxidic nanoparticle.

For the case where the central moiety is a low molecular weight organochemical central moiety, m preferably assumes a value of 3 to 100, in particular 3 to 50, particularly preferably 3 to 20, in particular 3 to 10, above all a value of 3, 4, 5, 6, 7, 8, 9 or 10.

For the case where the central moiety is an inorganic oxidic nanoparticle, m preferably assumes a value of 3 to 500,000, in particular 5 to 250,000, above all 10 to 100,000.

The low molecular weight organochemical central moiety is preferably a polyol containing at least 3, preferably 3 to 20, particularly preferably 3 to 10, in particular 3, 4, 5, 6, 7, 8, 9 or 10, OH groups, which in the branched molecule preferably form the link to the hydrophilic arms. In this regard, the links can in particular be ether or ester bonds. In this regard, the polyol can in particular be a monomeric or oligomeric as well as an optionally reduced sugar molecule. Here, the polyol may be selected from glycerin, threitol, erythritol, arabitol, adonitol, xylitol, sorbitol, mannitol, dulcitol, arabinose, ribose, xylose, glucose, mannose, galactose, fructose, rhamnose, fucose, saccharose, maltose, trehalose, cellobiose, melibiose and gentiobiose. Instead of polyols, any other branching moieties containing reactive groups can be used that by reacting with molecules having complementary reactive groups can be converted into branched molecules.

The inorganic oxidic nanoparticles are preferably nanoparticles of silica, zinc oxide, aluminum oxide, zirconium oxide, calcium carbonate, titanium dioxide, carbon, magnesium oxide or iron oxide. The nanoparticles are either commercially available or manufactured in situ or ex situ, preferably by sol-gel processes, precipitation from aqueous and non-aqueous solution, gas phase syntheses (flame pyrolysis, chemical vapour deposition, etc.), mechanical treatment (e.g. grinding, ultrasound). Their size is particularly preferably 0.5 to 200 nm, quite particularly preferably 0.5 to 20 nm.

In the case where oxidic nanoparticles are used as the central moiety the polymeric arms are preferably bonded to the nanoparticle surface through hydrolyzable silyl end groups. A linkage can, however, occur through other groups that react with the surface such as for example carboxy groups, cationic groups (e.g. trialkylammonium groups), phosphonate groups, etc. Linear polyoxyalkylene diols, whose two OH groups are reacted with silanes that are reactive towards OH groups, such as isocyanatosilanes, are particularly suitable for introducing the polymeric arms on the nanoparticle. Other suitable compounds for introducing the polymeric arms on the nanoparticle include polyether polyols for example VORANOL®, TERRALOXC, SYNALOX® and DOWFAX® from Dow-Chemical Corporation, SORBETH® from Glyco-Chemicals Inc., GLUCAM® from Amerchol Corp., or Lupranol® and Pluronic® from BASF.

The hydrophilic arms of the inventive star-shaped polymer, and in particular the A group, preferably are moieties that include polymer moieties and/or consist of them, wherein the hydrophilic moieties are preferably selected from poly-$C_2$-$C_4$ alkylene oxides, polyoxazolidones, polyvinyl alcohols, homopolymers and copolymers that comprise at least 50 wt % polymerized N-vinyl pyrrolidone, homopolymers and copolymers that comprise at least 30 wt % polymerized acrylamide and/or methacrylamide, homopolymers and copolymers that comprise at least 30 wt % polymerized acrylic acid and/or methacrylic acid. In this regard, polymeric arms that consist of polyethylene oxide or ethylene oxide/propylene oxide copolymers are particularly preferred. If the quite particularly preferred ethylene oxide/propylene oxide copolymers are employed, then a propylene oxide fraction of not more than 60 wt %, preferably not more than 30 wt % and particularly preferably 10-25 wt % is recommended.

The molecular weight of the hydrophilic arms is preferably 500 to 30,000 g/mol, particularly preferably 1,000 to 25,000 g/mol, above all 2,000 to 20,000 g/mol, in particular 2,000 to 5,000 g/mol or 15,000 to 20,000 g/mol.

Examples of divalent, low molecular weight organic groups that can stand for X and Y are aliphatic, heteroaliphatic, araliphatic, heteroaraliphatic, cycloaliphatic, cycloheteroaliphatic as well as aromatic and heteroaromatic groups. The low molecular weight groups can be linear or branched as well as containing nitrogen atoms and carbonyl group in particular. Short chain aliphatic and heteroaliphatic groups are particularly preferred. Exemplary suitable groups are the ethyl, propyl, butyl, aminoethyl, aminopropyl, aminobutyl, N-(2-aminoethyl)(3-aminopropyl), 3-methacryloxypropyl, methacryloxymethyl, 3-acryloxypropyl, 3-isocyanatopropyl, isocyanatomethyl, butyraldehyde, 3-glycidoxypropyl, propylsuccinic anhydride, chloromethyl, 3-chloropropyl and hydroxymethyl groups.

Inventively preferably used isocyanate compounds are those that carry a silyl group, wherein the silyl group is preferably according to the general formula —$CR_2$—Si$(OR^b)_r(R^c)_{3-r}$, wherein $R^a$ stands for hydrogen or a linear or branched alkyl group containing 1 to 6 carbon atoms, $OR^b$ stands for a hydrolysable group, $R^c$ stands for a linear or branched alkyl group containing 1 to 6 carbon atoms, and r stands for a number from 1 to 3. $R^b$ preferably stands for a linear or branched alkyl group containing 1 to 6 carbon atoms.

The salt of the branched fatty acids is preferably employed in the inventive process in an amount of 0.001 to 5 wt %, in particular in an amount of 0.005 to 2 wt %, particularly preferably in an amount of 0.01 to 0.2 wt %, in particular in an amount of 0.01 to 0.05 wt %.

The reaction time is preferably 4 to 15 hours, in particular 4 to 10 hours, particularly preferably 4 to 6 hours, above all 4 to 5 hours, in particular about 4.5 hours.

The reaction is preferably carried out at a temperature of 40 to 120° C., in particular at a temperature of 70 to 110° C., above all at a temperature of 80 to 100° C.

The star-shape polymers obtainable in accordance with the present invention preferably correspond to compounds of the formula Z(-X-A-Y-O—C(O)—NH—$R^1$)$_m$, wherein Z, X, A and Y have the previously listed meanings and $R^1$ stands for the residue of the added isocyanate compounds, wherein the m (-X-A-Y-O—C(O)—NH—$R^1$) groups independently of each other can have a different meaning, in particular for example also when mixtures of different isocyanate compounds are employed.

According to the invention, $R^1$ can correspondingly stand for any residue, but preferably includes a functional group, particularly preferably a silyl group, and in particular the previously cited silyl group of the general formula —$CR^a_2$—$Si(OR^b)_r(R^c)_{3-r}$.

The average molecular weight of the inventively obtainable star-shape polymers is preferably 1,000 to 100,000, particularly preferably 2,000 to 50,000 and quite particularly preferably 5,000 to 30,000 g/mol.

39.6 mmol) at 80° C. Once the addition of IPTES was ended the catalyst was added to the reaction mixture. The reaction mixture was then stirred further at 90° C.

The course of the reaction was followed by NCO titration. Ideally, the reaction should continue until complete conversion of the isocyanate compounds has taken place. With the addition of Borchi® kat 22 and Borchi® kat 24 as the catalyst, an almost complete conversion of the isocyanate compounds could be achieved after 4.5 hours, even though the catalyst was employed in a substantially lower amount than DABCO. In contrast, with the addition of DABCO as the catalyst, there still remained a considerable fraction of unconverted isocyanate compounds in the reaction mixture even after 9.5 hours reaction time.

Moreover, it could be observed that by adding salts of branched fatty acids as the catalyst (Borchi® kat 22 and Borchi® kat 24), the reaction product showed only a slight increase in viscosity even after three weeks storage at 40° C., whereas the reaction product obtained using DABCO as the catalyst showed a significantly higher increase in viscosity, probably due to subsequent reactions within the obtained reaction product.

| Polyol | Catalyst | Catalyst amount | Reaction time | NCO end value | Visc. mPas 4 days | Visc. mPas 3 wks 23° C. | Visc. mPas 3 wks 40° C. |
|---|---|---|---|---|---|---|---|
| Voranol ™ 4053 | DABCO | 0.22 wt % | 9.5 hours | 0.22% | 4800 | 6800 | 40000 |
| Voranol ™ 4053 | Borchi ® kat 22 | 0.02 wt % | 4.5 hours | 0.02% | 6200 | 9800 | 14600 |
| Voranol ™ 4053 | Borchi ® kat 24 | 0.04 wt % | 4.5 hours | 0.00% | 7600 | 21200 | 18400 |

A further subject matter of the present invention is the use of inventive star-shaped polymers as a component in washing and cleaning agents, cosmetic agents, sealants and adhesives and surface treatment agents.

A further subject matter of the present invention is compositions that comprise inventive star-shaped polymers.

In a preferred embodiment, the compositions are aqueous or ethanolic solutions of inventive star-shaped polymers.

In a further preferred embodiment, the compositions are washing and cleaning agents, cosmetic agents, sealants and adhesives or surface treatment agents.

EXAMPLES

Example 1

Production of Star-Shaped Polymers

A mixture of three-armed and eight-armed star-shaped polyether polyols (Voranol™ 4053, Dow Chemical) was prepared and reacted with silyl group-containing isocyanate compounds ((3-isocyanatopropyl)triethoxysilane, IPTES) in the presence of different catalysts. Borchi® kat 22 and Borchi® kat 24 were employed as the catalysts. The conventionally employed catalyst DABCO was used as the reference. The isocyanate compounds were employed in equimolar amounts with respect to the hydroxyl groups of the star-shaped polymers.

For the preparation of the polymer, IPTES (70.1 mol) was slowly added with stirring to dried Voranol™ 4053 (490.6 g;

While at least one exemplary embodiment has been presented in the foregoing detailed description of the invention, it should be appreciated that a vast number of variations exist. It should be also appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for manufacturing star-shaped polymers, said process comprising the step of reacting a star-shaped alcohol with an isocyanate compound in the presence of a salt of branched fatty acids as the catalyst, wherein the isocyanate compound includes a silyl group.

2. The process according to claim 1, wherein said salt of branched fatty acids is selected from the group consisting of Zn(II) $C_{3-24}$ fatty acid salts, Bi(III) $C_{3-24}$ fatty acid salts, and mixtures thereof.

3. The process according to claim 1, wherein said star-shaped alcohol comprises a star-shaped polymer having peripheral hydroxyl groups.

4. The process according to claim 1, wherein said star-shaped alcohol has the general formula Z(-X-A-Y-OH)$_m$, wherein Z denotes a central branch moiety that determines the maximum number of arms of the star-shaped polymers; A denotes a hydrophilic polymeric arm; X and Y independently denote a chemical bond or a divalent, low molecular weight organic group of 1 to 50 carbon atoms; m is from 3 to 500,000; and the m (X-A-Y-OH) groups independently of each other may be different.

5. The process according to claim 1, wherein said silyl group has the general formula $-CR^a_2-Si(OR^b)_r(R^c)_{3-r}$, wherein $R^a$ is hydrogen or a linear or branched alkyl group containing 1 to 6 carbon atoms; $OR^b$ is a hydrolysable group; $R^c$ is a linear or branched alkyl group containing 1 to 6 carbon atoms; and r is 1 to 3.

* * * * *